United States Patent [19]

Johnson

[11] E Re. 30,710

[45] Reissued Aug. 18, 1981

[54] TIERED CONTAINER WITH FLOW DISTRIBUTION SYSTEM

[75] Inventor: Robert C. Johnson, Winston-Salem, N.C.

[73] Assignee: Reynolds Leasing Corporation, Jacksonville, Fla.

[21] Appl. No.: 96,610

[22] Filed: Nov. 21, 1979

Related U.S. Patent Documents

Reissue of:

[64] Patent No.: 4,062,367
Issued: Dec. 13, 1977
Appl. No.: 682,413
Filed: May 3, 1976

[51] Int. Cl.[3] ..... A24B 3/18

[52] U.S. Cl. ..... 131/302; 131/296; 131/901

[58] Field of Search ..... 131/133, 134, 140 R, 131/140 P, 135, 136, 137; 99/323.4, 323.5, 323.6, 323.7, 323.9, 223.11, 516, 587, 485–487; 34/209, 211, 212, 238; 206/503, 508, 515, 519, 520

[56] References Cited

U.S. PATENT DOCUMENTS

| | | | |
|---|---|---|---|
| Re. 20,932 | 11/1938 | Smith | 131/133 A |
| 213,245 | 1/1877 | Parks | 99/323.4 |
| 351,432 | 10/1886 | Free et al. | 34/211 |
| 952,941 | 3/1910 | Perkins | 34/211 X |
| 2,060,408 | 11/1936 | Wood | 99/323.4 X |
| 2,669,030 | 2/1954 | English et al. | 34/211 |
| 3,325,912 | 6/1967 | Bojner et al. | 34/209 |
| 3,747,511 | 7/1973 | Palyi | 99/516 |

FOREIGN PATENT DOCUMENTS

| | | | |
|---|---|---|---|
| 317564 | 8/1929 | United Kingdom | 131/134 |
| 549349 | 11/1942 | United Kingdom | 131/134 |

*Primary Examiner*—Vincent Millin
*Attorney, Agent, or Firm*—Grover M. Myers

[57] ABSTRACT

A tiered container for use in an autoclave of an apparatus used in a process for increasing the filling capacity of tobacco, said process utilizing a compound to impregnate the tobacco and a hot gas to vaporize the impregnating compound.

9 Claims, 3 Drawing Figures

TIERED CONTAINER WITH FLOW DISTRIBUTION SYSTEM

Matter enclosed in heavy brackets [ ] appears in the original patent but forms no part of this reissue specification; matter printed in italics indicates the additions made by reissue.

BACKGROUND OF THE INVENTION

This invention relates to an improved container for use in a "batch" type process for treating tobacco to increase its filling capacity. In particularly, the invention relates to a tiered container including at least two baskets which provide a uniformed and directional fluid flow distribution.

As is well known in the art, there are various processes for increasing the filling capacity of tobacco by using a volatile organic compound. In these presently known processes, the tobacco is contacted with a liquid or vapor to impregnate the cell with the compound. Then the impregnated tobacco is heated to a temperature above the boiling point of the compound to vaporize the liquid in the tobacco, thus, causing expansion. Embodiments of this basic procedure are described in U.S. Pat. Nos. 3,524,451 and 3,524,452 which issued on Aug. 18, 1970, and U.S. Pat. No. 3,575,178 which issued on Apr. 20, 1971. U.S. Pat. Nos. 3,524,452 and 3,575,178 disclose processes which have a continuous in-feed, thus, they are identified as "continuous" processes.

Also well known in the art is the process for increasing the filling capacity of tobacco by establishing a bed of tobacco in a hermetically sealed chamber, vaccuumizing the chamber, contacting the tobacco in the chamber with a volatile organic compound to impregnate it, and thereafter passing a hot gas through the bed of tobacco to expand it. This process is described in U.S. Pat. No. 3,753,440 which issued Aug. 21, 1973, and it is identified as a "batch" process due to the non-continuous nature of the process. As disclosed in U.S. Pat. No. 3,753,440, the tobacco is placed in a tub or basket which has a screen upon which the tobacco rests which is spaced from the bottom of the tub. The tub has an inlet below the screen through which an impregnated compound and hot gas are injected, whereby the compound and hot gas will pass up through the bed of tobacco carried on the screen.

It has been found that between 450 to 750 pounds of tobacco must be treated during each of the "batch" process cycles in order for the process to be commercially feasible. With this amount of tobacco being processed, several problems result when utilizing a single bed in the "batch" process. Basically, there is a non-uniformity of vapor and steam distribution producing a longer cycle time due to the thickness of the bed which reduces expansion and causes the tobacco in the lower portion of the bed to collapse due to the weight of the tobacco above. In particular, one of the major problems of the single bed basket is the long period of time required to expose the bed of tobacco to the hot gas during the process. In order for these above described processes to produce a satisfactory result in increased filling capacity, the impregnated tobacco must be quickly subjected to the hot gas to vaporize and drive off the volatile compound. If a long period of time is required to contact the tobacco with the hot gas, expansion is impaired. Furthermore, it has been found that excellent results are obtained if the hot gas initially contacts the top of the tobacco bed and penetrates through the bed rather than from the bottom to the top.

SUMMARY OF THE INVENTION

It is, therefore, an object of this invention to provide a tobacco container for use in a "batch" process which will permit an even distribution of vapor and hot gases.

Another object of this invention is to provide a container which will permit a large quantity of tobacco to be processed in a plurality of small beds.

Still another object of this invention is to provide a tiered container which will permit a substantially equal amount of hot gas to be directed into each tier at substantially the same time.

Another object of this invention is to provide a tiered container which will permit all of the tobacco carried in each tier to be subjected to the hot gas in a selected interval of time.

Still another object of this invention is to provide a tiered container which will permit the hot gas to enter the tobacco from the top and penetrate to the bottom of the bed.

These and other objects are accomplished by the present invention by a tiered container for receiving a quantity of tobacco to be processed. Each tier receives a proportionate amount of a total quantity of tobacco. The bottom or lower tier includes a generally cone-shaped bottom plate which has a center aperture and is secured at its peripheral edges to a side wall which circumscribes the bottom plate to define a basket. Spaced from the bottom plate is a perforated member upon which the tobacco is placed. The perforated member has a central opening which receives a conduit. Extending around the periphery of the basket and secured to the side wall is a sealing member. A connector rod is secured to the bottom basket and extends upwardly through its conduit to permit several baskets to be secured together for loading and unloading purposes.

The upper tier baskets are stacked one on another and are constructed similarly to the lower tier. The upper tier further includes support feet attached to the periphery of the bottom plate which engage the upper peripheral edge of the tier below to support the upper tier and stabilize the stack. The aperture in the bottom plate in each of the upper tiers is slightly smaller than the conduit of the tier below so that the bottom plate of the upper tier will rest on the edge of the conduit to provide a seal which aids in directing the vapor and hot gas through the conduit. The upper tiers have no sealing member around the periphery.

BRIEF DESCRIPTION OF THE DRAWINGS

The foregoing and additional objects, features and advantages of the invention will be apparent to those skilled in the art from the following detailed description of the preferred embodiment, taken with the accompanying drawings, in which.

DESCRIPTION OF A PREFERRED EMBODIMENT

Figure 1:
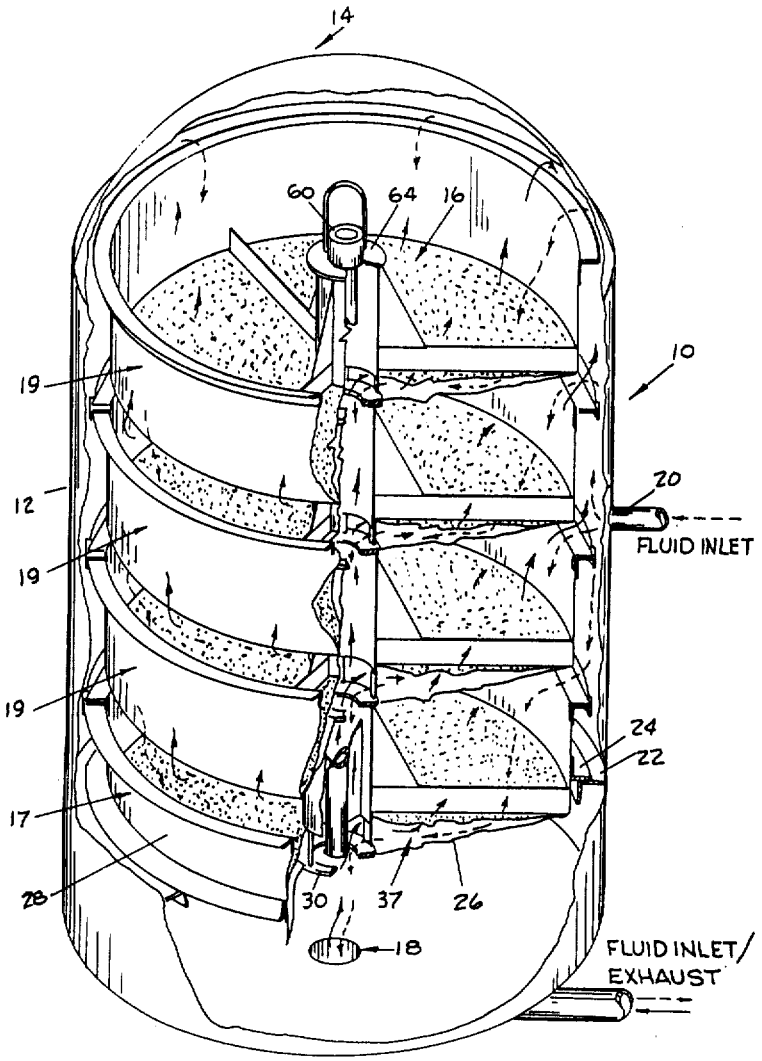
FIG. 1 is a perspective view of an existing autoclave with a tiered flow distribution container carried therein in accordance with the present invention.

Referring more particularly to the drawings, in FIG. 1 the numeral 10 indicates an autoclave or chamber which is used in a "batch" type process for increasing the filling capacity of the tobacco. The autoclave has a body section 12 and a lid section 14 which can be removed to permit a tiered fluid distribution container 16 to be positioned in the autoclave. The tiered container has one lower tier basket 17 and one or more upper tier baskets 19. The autoclave has an inlet/exhaust port 18 in its bottom through which a volatile organic compound such as those suggested in Column 4, Lines 15 to 62 of U.S. Pat. No. 3,753,440 can be introduced into the autoclave in a liquid or vapor state and a mixture of hot gas such as steam and vapor can be exhausted. At approximately the middle of the autoclave is a second inlet port 20 through which a hot gas can be introduced into the autoclave.

Figure 2:
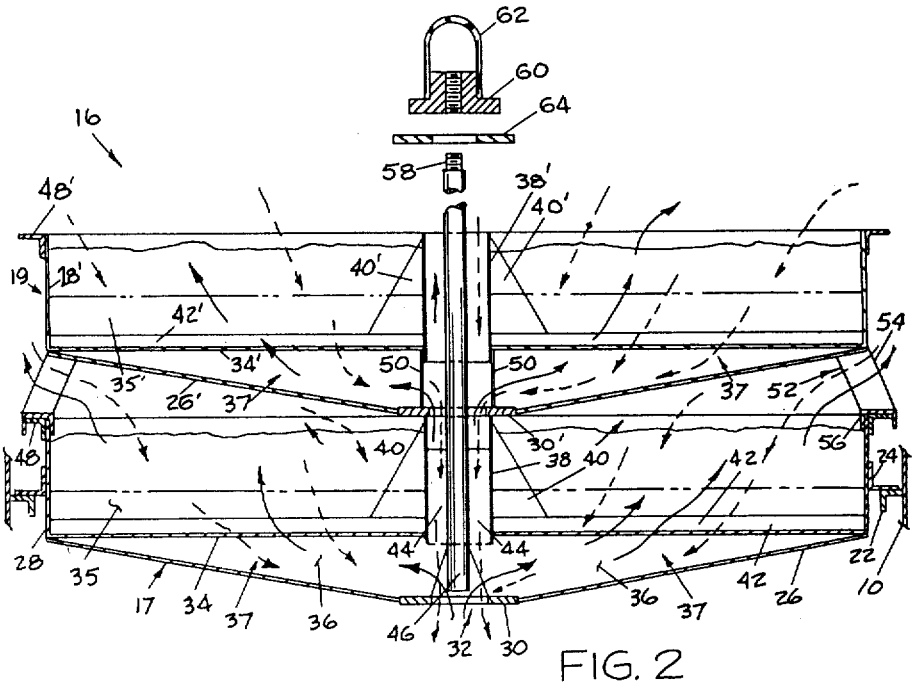
FIG. 2 is a section view of the tiered container disclosing a lower tier basket and one upper tier basket configuration according to the present invention.

The solid and broken arrows in FIGS. 1 and 2 illustrate the flow path of the various fluids (vapor and hot gas). Spaced from the bottom of the autoclave is a seal support member 22 extending around and secured to the autoclave's interior wall. The support member 22 mates with a second seal support member 24 secured to and extended around the lower tier basket 17 to support the tiered container 16 and hold it off of the bottom of the autoclave. These support seal members prevent any fluid from passing around the edges of the lower basket, thus, causing the vapors to be directed upwardly or downwardly through the baskets as will be explained hereinafter. Although the autoclave and baskets are illustrated as being circular, it should be understood that any configuration will function equally as well.

In this preferred embodiment of the tiered container 16, as mentioned previously, there is one lower tier basket 17 and three upper tier baskets 19 which are stacked one upon the other (See FIG. 1). Again, as previously mentioned, the lower tier 17 has a seal support member 24 secured thereto which rests on the seal support member 22 attached to the autoclave 10. The lower tier basket has a generally cone-shaped bottom plate 26 which has its outer peripheral edge secured to a side wall 28 which circumscribes the bottom plate to form the basket. At the center of the cone-shaped bottom plate is a reinforcing ring 30 having a center opening 32.

Extending inwardly at right angles from the bottom of the side wall 28 and spaced upwardly from the bottom plate 26 is a perforated sheet member 34 which is supported by three gusset plates 36 that extend radially from the center of the basket and are angularly spaced. Although three gussets are used in this preferred embodiment, the perforated member can be made of such strength that no gussets are required or more than three gussets may be necessary. The inwardly increasing flow space or passage 37 produced by the cone-shaped bottom plate 26 and the perforated sheet member 34 is provided to allow a uniform flow of gas or vapor. A larger quantity of gas or vapor is present in the passage 37 near the center of the basket as opposed to the outer extremities, thus, the larger flow rate will be required through the passage near the center of the basket.

Figure 3:
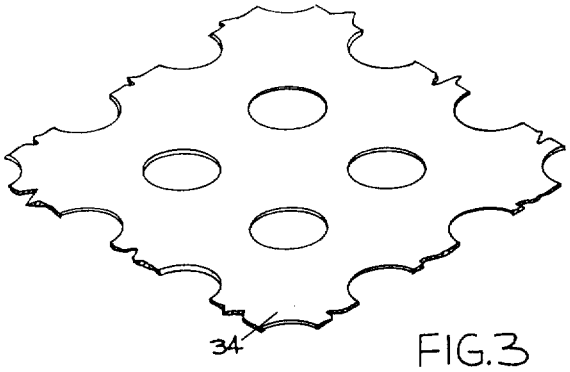
FIG. 3 is a perspective of a section of the perforated member carried in the baskets.

The perforated member can be of any desired configuration, such as screen, expanded metal or perforated sheet metal. However, the perforations should be of such size that cut filler (tobacco) will not easily fall through the openings and there should be sufficient openings to provide for a uniform passage of fluids through a tobacco bed 35. It has been found that a perforated metal sheet approximately 1/16 inch in thickness, with 3/32 inch openings stagered on ⅛ inch centers will perform satisfactorily (see detail in FIG. 3). Such perforated metal can be obtained from the Accurate Perforating Company, Inc., Chicago, Ill.

The perforated sheet member 34 has a central opening through which a pipe or tubular conduit 38 is inserted. The pipe rests on and is secured to the gussets 36. Contiguous to its lower end, the pipe is secured to the perforated sheet member. Secured to the pipe 38 at angularly spaced intervals are vertically positioned triangular gussets 40 which are also secured to radially extending stiffeners 42 extending from the pipe to the vertical side wall 28. The stiffeners 42 and the triangular gussets 40 retain the pipe 38 in its center location.

Within the pipe section 38 and extending radially inward therefrom are spacer plates 44 which secure a connector rod 46 centrally within the pipe. The connector rod 46 extends upwardly through the upper baskets 19 and will connect the baskets together as one unit as will be explained hereinafter. A reinforcing member 48 made from a rolled angle is secured to the top edge of the vertical wall 28.

The upper tier baskets, which are constructed similarly to the lower tier baskets have a cone-shaped bottom plate 26' with a reinforcing ring 30', a vertical side wall 38' to form the basket. Perforated sheet member 34' is spaced from the bottom plate and a pipe 38' extends through its center. The pipe is supported by a plurality of vertical posts 50 which are secured to the lower end of the pipe and to the reinforcing ring 30'. The upper baskets have triangular gussets 40', stiffener members 42' and a reinforcing angle 48' similar to the lower basket.

In addition, an upper basket has three foot assemblies 52 angularly spaced around the bottom of the basket and secured thereto. The foot assemblies include an incline post 54 and an inverted channel 56 secured to the bottom of the post. The inverted channel mates with the reinforcing angle 48 on the upper end of the vertical wall 28 of the basket below. As can be seen in FIG. 2, the foot assemblies aid in supporting and positioning the basket so that the connector rod 46 will extend upwardly through the center of pipe 38'. The upper tier baskets do not require a seal support member 24, gusset plates 36 or the spacer plates 44. Each of the upper tier baskets also contacts the basket below, around its reinforcing ring which rests on the upper edge of the center pipe 38, 38', etc. These contacting surfaces act as seals to prevent the passage of gas or vapor.

The upper end of the connector rod 46 has a threaded portion 58 which receives a nut 60 having a lifting loop or tongue 62 so that the tiered container 16 can be secured together for lifting and handling. A sealing washer 64 is provided between the nut 60 and the top edge of the pipe 38 of the uppermost tier basket.

The tiered container is formed as illustrated to produce a specific flow pattern for the gas and vapors in the autoclave.

As can be seen by the solid arrows in FIGS. 1 and 2, the volatile organic compound used in the expansion process is introduced into the autoclave 10 through port 18 in the bottom of the autoclave. If the compound is in a liquid state, the autoclave is heated to vaporize the liquid so that the vapor rises in the autoclave and condenses on the tobacco. During the operation of the process, the impregnation stage is of sufficient duration that the vapor can flow through the basket from the bottom to top. The vapors are prevented from passing upward along the sides of the lower tier basket 17 because of the seal support members 22 and 24, thus, the vapors are channeled through opening 32 into the spaces 37 then upwardly through the perforated sheet member 34 into the tobacco bed 35. A portion of the vapors continue upwardly through the center pipe 38 into the spaces 37' between the bottom plate 26' and the peripheral sheet member 34' in the first upper tier basket 19. Similarly, the vapor penetrates the tobacco bed 35' through the perforated sheet member 34'. As can be easily understood, a portion of the vapor also continues up through the center pipe 38' and penetrates the remaining tobacco beds in the similar fashion.

As the vapor exits the tobacco beds, it is allowed to flow upwardly around the basket walls and can contact the tobacco in the upper tiers, thereby thoroughly penetrating the entire bed. The vapor is prevented from returning to the bottom of the autoclave by the washer 64 which blocks the center passage and the seal support members 22 and 24. After the tobacco has been thoroughly impregnated, all of the tobacco beds must be subjected to the hot gas in as short an interval of time as possible to insure a satisfactory increase in the filling capacity of the tobacco. The vapors given off by the vaporizing liquid in the tobacco must be removed from the autoclave. For this reason, it is difficult to supply the hot gas to the autoclave from the bottom; therefore, the hot gas is introduced into the autoclave through port 20. The hot gas is prevented from going into the bottom of the baskets because of the bottom plates 26'. The pipe 38 and reinforcing ring 30' seal the center conduit to prevent hot gas from passing into the center pipe. Thus, the hot gas must enter the beds from the top through the spaces between the bottom plates of the baskets and the top of the beds. By introducing the hot gas into the baskets in this manner, more of the tobacco is contacted in a shorter period of time because a larger area of tobacco is exposed to the hot gas. It has been found that, for the best results, the expanding phase of the process should be between 15 to 90 seconds. The hot gas flows down through the beds, expanding the tobacco by vaporizing and driving off the compound impregnated deep within the tobacco cells. A mixture of hot gas and the vapor is directed through spaces 37 below the perforated sheet into the central pipes 38, 38', etc. and out the exit port 18.

It can be seen from the above description and drawings that the tiered container of the present invention provides a container for a "batch" process which will permit a large quantity of tobacco to be subjected to various fluids in the process in a plurality of smaller quantities to produce a more efficient process. It also provides a basket which permits a uniform distribution of fluids used in the process and provides a large area of the tobacco being processed to be subjected to the hot gas in a shorter period of time.

The above-described preferred embodiment can be modified in various ways as is apparent from the foregoing; for example, the structural members can be increased in size to eliminate the requirements for reinforcing members, the perforated sheet can be of any material which will provide support and a proper flow rate, but these variations and modifications can be made to the invention as above described and illustrated without departing from the true spirit and scope thereof as defined in the following claims:

I claim:

[1. A tiered container for use in the autoclave of an apparatus used in a process for increasing the filling capacity of tobacco, said process utilizing a volatile organic compound to impregnate the tobacco carried in beds in the tiered container and a hot gas to vaporize the compound in the tobacco, said tiered container comprising at least two baskets, each of said baskets including:

a. a bottom with an aperture therein;
b. a side wall secured to and circumscribing said bottom;
c. a perforated member positioned above said bottom and within said side wall providing a flow passage between said perforated member and said bottom, said perforated member receiving a portion of the total quantity of tobacco to be processed; and
d. a conduit communicating with the flow passage and said aperture within its basket and the aperture and flow passage of an adjacent basket, whereby a fluid can pass upwardly through said apertures into said flow passages and through the perforated members into the tobacco beds and downwardly through said beds into said flow passages and into said conduits adjacent said basket.]

[2. The tiered container of claim 1, wherein said fluid passing upwardly through said baskets is an impregnating compound and said fluid passing downwardly through said baskets is a hot gas.]

[3. The tiered container of claim 1, further including a sealing member on the lowermost basket to prevent fluid from passing between the lowermost basket and the autoclave wall, thereby directing the fluid through the aperture in the bottom.]

[4. The tiered container of claim 3, further including a sealing element for sealing of the conduit of the uppermost basket, thereby causing the downwardly flowing fluid to enter the flow passages through the tobacco beds.]

[5. The tiered container of claim 4, wherein the conduit of one of said baskets contacts the bottom of an upper basket surrounding said aperture, whereby the fluid can pass downwardly from one basket to another only through the conduits and upwardly from one basket to another through the tobacco beds and the conduits.]

[6. The tiered container of claim 5, wherein the upper basket further includes means for positioning and supporting it with respect to an adjacent lower basket.]

[7. The tiered container of claim 6, further including means for connecting the baskets together, whereby they can be handled as a single unit.]

[8. A tiered container for use in an autoclave of an apparatus for increasing the filling capacity of tobacco including a lower basket and at least one upper basket, said lower basket comprising:

a. a cone-shaped bottom having an aperture therein;
b. a side wall circumscribing said bottom;
c. a perforated sheet located within said side wall and positioned above said bottom to form a flow passage between said bottom and said perforated sheet, said flow passage diverging inwardly from the side wall towards the center of the basket;
d. a conduit extending through said perforated sheet and communicating with said flow passage; and e. a sealing member secured to the outside surface of said side wall which is adapted to mate with said autoclave;

said upper baskets comprising:

a. a cone-shaped bottom having an aperture therein;

b. a side wall circumscribing said bottom;

c. a perforated sheet located within said side wall and positioned above said bottom to form a flow passage between said bottom and said perforated sheet, said flow passage diverging inwardly from the side wall towards the center of the basket;

d. a conduit extending through said perforated sheet and communicating with said flow passage; and e. means for positioning said upper basket on an adjacent basket below so that said conduit of said adjacent basket below is in a sealing relationship with the bottom of the above adjacent basket and communicates with the flow passage of the above adjacent basket through the aperture in its bottom.]

[9. The tiered container of claim 8, further including a sealing member for closing the upper end of the conduit of the uppermost basket when said baskets are being utilized in said apparatus.]

[10. The tiered container of claim 9, further including means for securing said baskets together.]

*11. An improved apparatus for increasing the filling capacity of tobacco having a pressure vessel for receiving the tobacco and which utilizes a volatile organic compound to impregnate the tobacco and a hot gas to vaporize the compound in the tobacco, said improved apparatus comprising:*

*a stack or tier of containers mounted within said pressure vessel and comprising a plurality of spaced apart, individual containers each comprising a basket including:*

*(a) a bottom with an aperture therein;*

*(b) a side wall secured to and circumscribing said bottom;*

*(c) a perforated member positioned above said bottom and within said side wall providing a flow passage between said perforated member and said bottom, said perforated member receiving a portion of the total quantity of tobacco to be processed; and*

*(d) a conduit communicating with the flow passage and said aperture within its basket and the aperture and flow passage of an adjacent basket, whereby a fluid can pass upwardly through said apertures into said flow passages and through the perforated members into the tobacco beds and downwardly through said beds into said flow passages and into said conduits adjacent said basket,*

*means operably connected to said central flow passage for supplying a volatile organic impregnating fluid upwardly through said central flow passage and substantially simultaneously upwardly and outwardly through the flow passages and perforated members of said individual containers to contact and treat tobacco confined within the individual containers with the impregnating fluid in a bottom-to-top manner, and*

*means operably connected to said vessel and communicating with the spaces between said individual containers for supplying a hot gas into said spaces and downwardly through the perforated members and flow passages of said individual containers and into and downwardly through said central flow passage to contact the tobacco confined within said individual containers with the hot gas in a top-to-bottom manner to vaporize the impregnating fluid and expand the tobacco.*

*12. The apparatus of claim 11, further including a sealing member on the lowermost basket to prevent fluid from passing between the lowermost basket and the pressure vessel wall thereby directing the fluid through the aperture in the bottom of the lowermost container and into the central flow passage.*

*13. A process for treating a predetermined quantity of tobacco to increase its filling capacity utilizing a pressure vessel and comprising the steps of:*

*dividing said quantity of tobacco into several small portions and confining said small portions into individual containers of a plurality of stacked containers, each container having a bottom wall with an aperture therein, a side wall secured to and circumscribing said bottom, a fluid permeable floor member positioned within said side wall and above said bottom wall, providing a flow passage between the permeable floor member and the bottom wall and an open top tobacco confining space above the floor member and within said side walls, and a conduit communicating with said flow passage and said aperture in said bottom wall and extending upwardly from the flow member to the bottom of the next adjacent container with said conduit communicating with the aperture therein, the conduits of said plurality of stacked containers cooperating to provide a substantially continuous central flow passage communicating simultaneously with the flow passages of said individual containers to produce a predetermined flow pattern;*

*passing a volatile organic impregnating fluid into said pressure vessel and directing said impregnating fluid upwardly through said central flow passage and substantially simultaneously upwardly and outwardly through the flow passages and fluid permeable floor member of said individual containers to contact and impregnate tobacco confined in the individual containers in a bottom-to-top manner;*

*passing a hot gas into said pressure vessel and directing said hot gas downwardly through the tobacco in said tobacco confining spaces and downwardly through said fluid permeable floor member, flow passages of each of said individual containers and through said central flow passage in a top-to-bottom manner to vaporize the impregnating fluid and expand the tobacco.*

*14. The process of claim 13, further including providing a means to separate the internal spaces within the pressure vessel into upper and lower zones with a tobacco bed confined in the upper zone and the impregnating fluid being directed into the lower zone and then upwardly through the tobacco in the upper zone and the hot gas being directed into the upper zone and downwardly through the tobacco into the lower zone.*

*15. An improved tobacco processing apparatus for increasing the filling capacity of tobacco by impregnating the tobacco with a volatile organic compound and using a hot gas to vaporize the compound in the tobacco, said tobacco processing apparatus being contained within a pressure vessel and comprising a plurality of spaced-apart individual containers, each of said containers comprising:*

*(a) a bottom wall having an aperture therein;*

*(b) a side wall secured and subscribing said bottom;*

*(c) a fluid permeable floor member positioned above said bottom and within said container side wall to provide a flow passage between said bottom and said floor*

*member and an open-topped tobacco confining space above the floor member and within said side wall; and*

*(d) a conduit communicating with said flow passage and said aperture in said bottom wall and extending upwardly from said floor member to the bottom wall of the next adjacent container where said conduit communicates with the aperture therein, the conduits of said plurality of containers cooperating to provide a substantially continuous central fluid passage communicating simultaneously with the flow passages in said individual containers so that said volatile organic impregnating fluid can be directed upwardly through said central flow passage and substantially simultaneously upward and outwardly through the flow passages and fluid permeable floor members of said individual containers to contact and treat tobacco confined within the individual containers with the impregnating fluid in a bottom-to-top manner and for directing the hot gas into the confining spaces and downwardly through the fluid permeable floor members and flow passages of said individual containers and into and downwardly through said central passage to contact the tobacco confined within the individual containers with the hot gas in a top-to-bottom manner to vaporize the impregnating fluid and expand the tobacco.*

*16. The tobacco processing apparatus of claim 15, further including a sealing means disposed between the lowermost individual container in said plurality of containers and the side wall of said pressure vessel to divide the interior space within the pressure vessel into separate upper and lower zones.*

*17. The tobacco processing apparatus of claim 15, wherein said containers further include means for supporting and positioning the basket with respect to adjacent lower containers.*

*18. The tobacco processing apparatus of claim 15, further including means for connecting the containers together, whereby said plurality of containers can be handled as a single unit.*

*19. The tobacco processing apparatus of claim 15, wherein said bottom wall of said containers is cone-shaped, whereby said flow passage diverges inwardly from said container side walls into the center of the container.*

* * * * *